Dec. 22, 1942.  M. W. SWANEY  2,306,027
HYDROCULTURAL PROPAGATION
Filed March 9, 1939
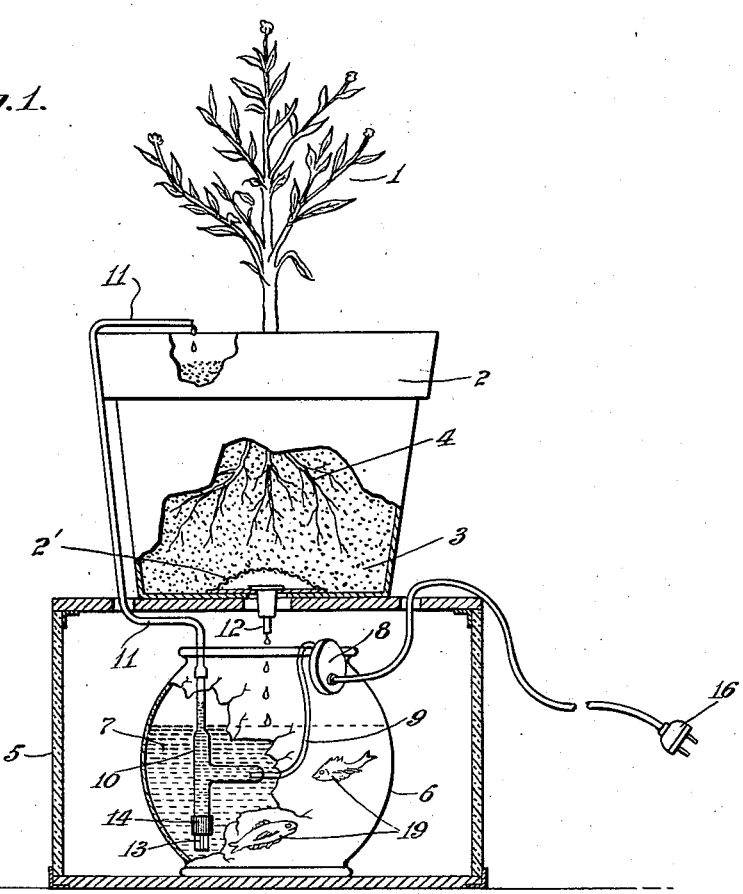
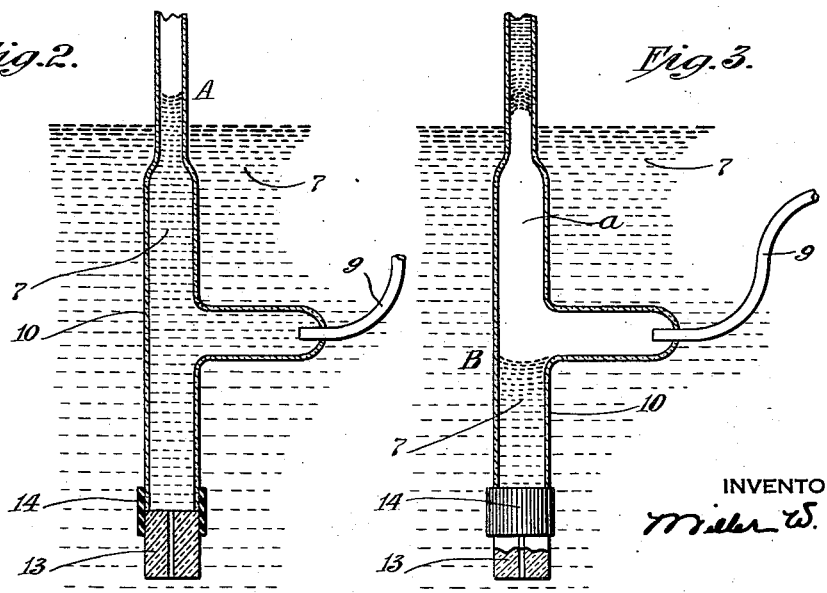
INVENTOR
Miller W. Swaney Patented Dec. 22, 1942

2,306,027

UNITED STATES PATENT OFFICE 2,306,027

HYDROCULTURAL PROPAGATION

Miller W. Swaney, Verona, N. J., assignor to Ellis Laboratories, Inc., a corporation of New Jersey Application March 9, 1939, Serial No. 260,688

2 Claims. (Cl. 47—38)

This invention relates to improvements in the hydroculture of plants. It involves also the simultaneous hydroculture of species of plants and fish.

It is an object of this invention to propagate plants with nutrient liquids, the latter being simultaneously aerated and circulated over the roots of plants. Another object of this invention comprises propagating fish in the liquid nutrient media utilized in maintaining plant growth by hydrocultural means.

There are two main divisions of plant hydroculture, namely, water culture, and aggregate culture. In the former method, a plant is suspended above an aqueous nutrient solution, containing the chemical elements necessary for plant growth; and the plant's roots are allowed to dip into the chemical solution. In the aggregate method, a plant is supported by sand, cinder, gravel, or other suitable aggregate, and an aqueous nutrient solution is allowed to flow continuously or at regular intervals, over this aggregate. In so doing, the nutrient medium thereby comes in contact with the plant's roots.

The nutrient solution used in either case contains, in dissolved form, salts of the elements known to support plant life. These are, namely, nitrogen, phosphorus, potassium, calcium, magnesium, sulphur, iron, boron, zinc, copper and manganese. Potassium and phosphorus may be in the form of mono-potassium phosphate, $KH_2PO_4$, magnesium and sulphur as magnesium sulphate, and so on. These salts and elements are dissolved in the proper ratios and concentrations to produce desirable plant growth. A typical nutrient composition is given in Example 1. The growing or maintenance of fish in a nutrient solution used for supporting plant growth, I have hereinafter referred to as the simultaneous hydrocultural propagation of plants and fish.

Now, I have made certain improvements in apparatus applicable for hydroculture methods of plant propagation. I have devised means of maintaining the nutrient solution in circulatory flow, during which flow it comes in contact with the plants' roots and in addition, air, by which it is effectively aerated. I have also devised means of recirculating solution that has been used so that substantially no mechanical losses occur. My invention can be described with the aid of accompanying Figures 1, 2, and 3. Figure 1 represents a side view of the propagating means with cut away sections to more clearly show the important features of the apparatus. Figures 2 and 3 are views of the aerator in different stages of operation, Figure 2 being during the intake cycle. By intake I mean the period during which nutrient is being removed from reservoir into the aerator. The discharge period is that portion of the aeration and/or nutrient solution movement cycle when the nutrient solution is being removed from the aerator to the pipe or other conveying means which ultimately carries said nutrient solution to the plant and/or fish propagating portion of the apparatus. In these figures, corresponding numerals in different figures represent identical items. In Figure 1, numeral 1 represents a plant growing in a plant propagating compartment 2, filled with sand 3, the roots 4 being distributed throughout the sand. The compartment 2 rests on a box-like base 5, which houses a nutrient solution reservoir 6, partially filled with aqueous nutrient solution 7. Electrically operated aerator 8 is so constructed as to be able to send out a quick but moderate blast of air at intervals of every few seconds whenever plug 16 is attached to a source of electrical power. Thereafter the aerator momentarily shuts itself off for 8 to 10 seconds, after which time the blast of air is then repeated, and so on. It is to be understood that the means by which this aerator is able to produce the succession of air blast is not a part of this invention. The gust of air travels into T-tube 10, thereby causing nutrient solution inside 10 (see also Figures 2 and 3) to travel upward through delivery tube 11. The solution emerging from the upper end of 11 falls onto the upper surface of the sand 3, and then flows, by gravity, over the sand and roots 4 and through screen 2', and emerges from the bottom of the container 2 by means of the drain tube 12, and returns to bowl 6. Thereafter the cycle is repeated over and over again. An additional step of my invention, as is described more fully hereinafter, consists of propagating fish 19 in the nutrient solution reservoir 6. In this case, the box-like structure 5 and reservoir 6 can be made of transparent sides.

The specific mode of action of the solution transporting and aerating device shown enlarged in Figures 2 and 3 is as follows: In Figure 2, which shows the device immediately before operating, the T-tube 10 contains nutrient solution up to the level A. Just at the time of operation, air a, or other "aerating gas," rushes in through tube 9 into T-tube 10 and exerts force on the nutrient solution in 10. The solution is almost completely prohibited from leaving 10 through the lower end because of resistance to rapid flow which is offered by capillary tube 13 which in turn is attached to T-tube 10 by connection 14. Instead, the air pressure causes the solution in tube 10 to rise up through delivery tube 11 and flow onto sand 3 (Fig. 1). After the solution is elevated, the air blast ceases and the air pressure in 10 is decreased. Thus during the ensuing eight or ten seconds solution 7 flows into tube 10 through capillary 13, pushing the air in tube 10 ahead of it and out through delivery tube 11. The liquid level in T-tube 10 is thus raised from level B to level A. The apparatus then stands ready for another operation motivated by air entering through tube 9. Thus is effected not only a continuous circulation of solution over the plant roots but also an efficient aeration of the solution as well. The gas used in causing solution to leave T-tube 10 by way of delivery tube 11 is hereinafter referred to as an aerating gas. Although I prefer to use air as the aerating gas in my invention, I may, without altering its aims, substitute other oxygen-containing gas mixtures for air, if desired.

My invention as thus outlined possesses several great advantages over all pre-existing small-scale hydroculture methods of plant propagation for household or office use. These advantages are:

1. The apparatus is electrically operated and therefore requires no undue or time-consuming attention.
2. Working intermittently, the aerator utilizes very little electric power.
3. Plants are supplied with continuous flow of aqueous plant food of uniform strength.
4. Nutrient solution, so used is effectively aerated, this being essential for good root growth.
5. Except for the surface of the sand, the system can be entirely enclosed, thereby minimizing evaporation and consequently loss of water which would result in undesirable changes in concentration of the nutrient solution.
6. The nutrient reservoir enclosure can be made of transparent material, thereby affording a clear view of the apparatus at all times.
7. The apparatus is compact and may be transported from place to place.
8. The apparatus is self-starting and requires no priming.

As is readily seen, my invention provides a very efficient means for the hydrocultural propagation of plants in aqueous nutrient solutions, a means of keeping the nutrient solutions in continuous and renewed contact with root surfaces, and means of maintaining the nutrient solutions in a state of efficient aeration.

As a further phase of my invention, I propose to add goldfish, tropical fish, and other small species directly to the nutrient solutions with which plants are to be propagated. I have made the very unexpected discovery that goldfish and tropical fish, which are accustomed to existence in fresh water, live and thrive in nutrient plant-food solutions. I have observed that these fish, which are generally maintained in fresh water of pH near 7.0, i. e., an aqueous medium which is substantially neutral and therefore contains substantially no dissolved acidic or alkaline bodies, are capable of thriving even in very acidic nutrient solutions of pH as low as 4.0. Water exhibiting the latter pH values will contain an appreciable or substantial proportion of acidic bodies. I have found further that goldfish are capable of living in nutrient solutions containing dissolved copper and/or zinc (as their respective salts) in quantities generally conceded to be lethal to fish.

For example, it is known that rainbow trout are killed by a concentration of ½ part of hydrated cupric sulphate ($CuSO_4.5H_2O$) in 1 million parts of water, or by a concentration of 2 to 5 parts of hydrated zinc sulphate ($ZnSO_4.7H_2O$) in 1 million parts of water, or by a 1:100,000 concentration of an iron salt. Yet, I have found that goldfish thrive in nturient solutions containing as much as 1½ parts per million of hydrated copper sulphate $$CuSO_4.5H_2O$$

and as great as 3 parts per million of mono-hydrated zinc sulphate ($ZnSO_4.H_2O$), in addition to a concentration of 1 part of hydrated ferrous sulphate ($FeSO_4.7H_2O$) in only 25,000 parts of nutrient solution. Furthermore, a pH value of 4.4 is known to cause the death of carp within 5 days. Yet I have observed that goldfish thrive in nutrient solutions of pH 4.0 even for a period of time as long as 10 days.

There are several advantages to this phase of my invention. These are, namely:

1. The addition of goldfish to nutrient solution containers creates a decorative effect of unusual interest.
2. The goldfish and other small fish tend to remove algae growth from the walls of the containers.
3. The plant growth is greatly stimulated by the presence of various hormone-like substances, which serve as plant-growth stimulants, and which are formed in situ in the fish droppings which discharge their plant-growth stimulants into the nutrient solution.

The following examples will serve to illustrate the principles set forth by my invention:

*Example 1.*—A granular nutrient mixture was prepared which contained the following salts:

|  | Grams |
|---|---|
| $NH_4H_2PO_4$ | 128 |
| $NaNO_3$ | 400 |
| $KCl$ | 224 |
| $CaSO_4.2H_2O$ | 160 |
| $MgSO_4.2.7H_2O$ | 192 |
| $FeSO_4.7H_2O$ | 8 |
| $NaHSO_4$ | 2 |
| $H_3BO_3$ (2 parts by weight); $MnSO_4.H_2O$ (2 parts by weight); $ZnSO_4.H_2O$ (2 parts by weight); $CuSO_4.5H_2O$ (1 part by weight) | 3 |

This composition was so compounded that 7 grams (1 rounded teaspoonful) dissolved in one gallon water gave a nutrient solution of the proper strength for normal plant growth.

*Example 2.*—An apparatus of the type illustrated in Figure 1 was assembled, using a flower pot (9-inch top diameter) filled with white quartz sand. The nutrient solution reservoir was a glass bowl of 1-gallon capacity containing 3-quarts of nutrient solution prepared according to Example 1. In the sand were planted three dormant tubers of the white calla lily. The lead-in wires of the aerator were plugged into an electric line and the flow of nutrient solution was begun. After 15 days the tubers had rooted and sent up shoots several inches long. After 30 days (from planting) these shoots were about 1 foot in length. The nutrient solution was replaced by fresh solution at this stage. Forty-five days after planting, the calla stalks were about 1½ feet in length and a number of large green leaves had unfurled.

During the growth of these callas, the solution was, at two-week intervals, replaced by fresh solution. Under this treatment, the callas continued to grow and thrive.

Example 3.—Three goldfish, which were accustomed to existence in tap water of pH 8.4 were placed in a 4-gallon glass container filled with a full-strength nutrient solution prepared by dissolving 28 grams of the composition of Example 1 in 4 gallons of water of pH 8.4. The pH of the resulting nutrient solution was 5.4. The fish apparently suffered no ill effects but retained their appetites and vitality. They were kept in nutrient solution of this concentration for 25 days, the solution being replaced by a newly prepared one of the same concentration once each week (approximately) during this period.

Example 4.—The three goldfish employed in Example 3, after remaining in the solution of Example 3 for 25 days, were transferred to nutrient solution of twice-normal strength. This was prepared by dissolving 56 grams of solid composition of Example 1 in 4 gallons of tap water of pH 8.4. The pH of the twice-normal nutrient solution was 4.4.

In this solution the fish were kept for 22 days, during which entire time they presumably suffered no harmful effects from the solution, and retained their appetites and vitality.

Example 5.—A nutrient solution of three-times normal strength was prepared by dissolving 84 grams of the solid composition of Example 1 in 4 gallons of tap water of pH 8.4. The pH of the resulting solution was 4.0.

The three goldfish were transferred from the twice-normal solution of Example 4 to the three-times normal strength solution, described in the preceding paragraph. They were kept in the latter solution for ten days, during which time they presumably suffered no ill effects of the solution and retained their appetites and vitality.

In this three-times normal strength solution copper and zinc, etc., were present in concentrations ordinarily sufficient to cause death. Yet, in the presence of the other chemical salts comprising the nutrient solution, the fish tolerated these metals with apparent impunity. In actual concentrations, this nutrient solution contained 3 parts per million of $ZnSO_4.H_2O$, 3 parts per million of $MnSO_4.H_2O$, 1½ parts per million of $CuSO_4.5H_2O$, and 1 part in 25,000 of $FeSO_4.7H_2O$.

Example 6.—Three tropical fish (1 male, 2 female guppies) were placed in an aqueous nutrient solution containing 7 grams of the composition of Example 1 dissolved in a gallon of water. The fish suffered no harmful effects and were in thriving condition even after 2-weeks immersion in this solution.

Example 7.—Into a 5-gallon rectangular glass tank was placed 4 gallons of solution containing 28 grams of the composition of Example 1. Above this solution, 3 small begonia and 2 small geranium plants (free of soil) were so suspended that only their roots dipped into the solution. In this nutrient solution were placed 2 goldfish. The plants grew very rapidly and blossomed profusely and the goldfish thrived splendidly. After each two-week period, the nutrient solution was completely replaced by fresh solution. After six weeks, the plants had increased in size several times and the goldfish were in excellent condition.

What I claim is:

1. An apparatus for the simultaneous propagation of plants and fish, comprising a plant propagating compartment containing means for supporting said plants; a fish propagating compartment, said fish propagating compartment being simultaneously the nutrient solution reservoir; and a simultaneously acting unitary aerator and circulator for said nutrient solution, the bottom of said plant propagating compartment being located at an elevation higher than the nutrient solution level in the fish propagating compartment, and said simultaneously acting unitary aerator and circulator operating substantially continuously, whereby circulation of the nutrient solution from said fish propagating compartment to said plant propagating compartment is effected.

2. An apparatus for the simultaneous propagation of plants and fish, comprising a plant propagating compartment containing means for supporting said plants; a fish propagating compartment, said fish propagating compartment being simultaneously the nutrient solution reservoir; a drain from the bottom of said plant propagating compartment to the top of said fish propagating compartment; and a simultaneously acting unitary aerator and circulator for said nutrient solution; the bottom of said plant propagating compartment being located at an elevation higher than the nutrient solution level in the fish propagating compartment, and said simultaneously acting unitary aerator and circulator operating substantially continuously, whereby circulation of the nutrient solution from said fish propagating compartment to said plant propagating compartment is effected and the volume of nutrient solution in said fish propagating compartment is maintained substantially constant.

MILLER W. SWANEY.